Nov. 14, 1961 P. M. J. BODEZ 3,009,058

CODED PULSE RECEIVERS

Filed June 21, 1960 3 Sheets-Sheet 1

Nov. 14, 1961 P. M. J. BODEZ 3,009,058

CODED PULSE RECEIVERS

Filed June 21, 1960 3 Sheets-Sheet 2

CODED PULSE RECEIVERS

Filed June 21, 1960

3 Sheets-Sheet 3

3,009,058

CODED PULSE RECEIVERS

Pierre Marcel Jean Bodez, Paris, France, assignor to Precision Mecanique Labinal Filed June 21, 1960, Ser. No. 37,663
Claims priority, application France June 22, 1959
11 Claims. (Cl. 250—20)

The invention relates to an improved coded pulse receiver wherein both a simplification and a saving in tubes are achieved, particularly in the time-voltage transformation and the command channel input parts of the receiving apparatus.

It is a specific object of my invention to likewise improve the high frequency section of such a receiver and to improve its reliability by substituting for the time-voltage transformation a channel separator comprising a small number of tubes (which are nevertheless more than two in number) but which offers very much greater accuracy of operation.

The invention likewise encompasses and is more specifically applicable, though not exclusively so, to a coding system in which each channel pulse consists in reality of three elementary pulses which are separated by fixed but adjustable time lapses and which time lapses together form a code, the spacings between the pulses being irregular in order to limit the risk of erroneous coincidence on decoding, and the whole system being contrived in such a way that a train of several equidistant pulses shall not have three pulses placed in the same position as that of one of the codes unless that train has a recurrence of the same magnitude as the length of the pulses.

The description which follows with reference to the accompanying drawings given by way of example only and not in a limiting sense will give a clear understanding of how the invention may be performed.

Figures 1, 4:
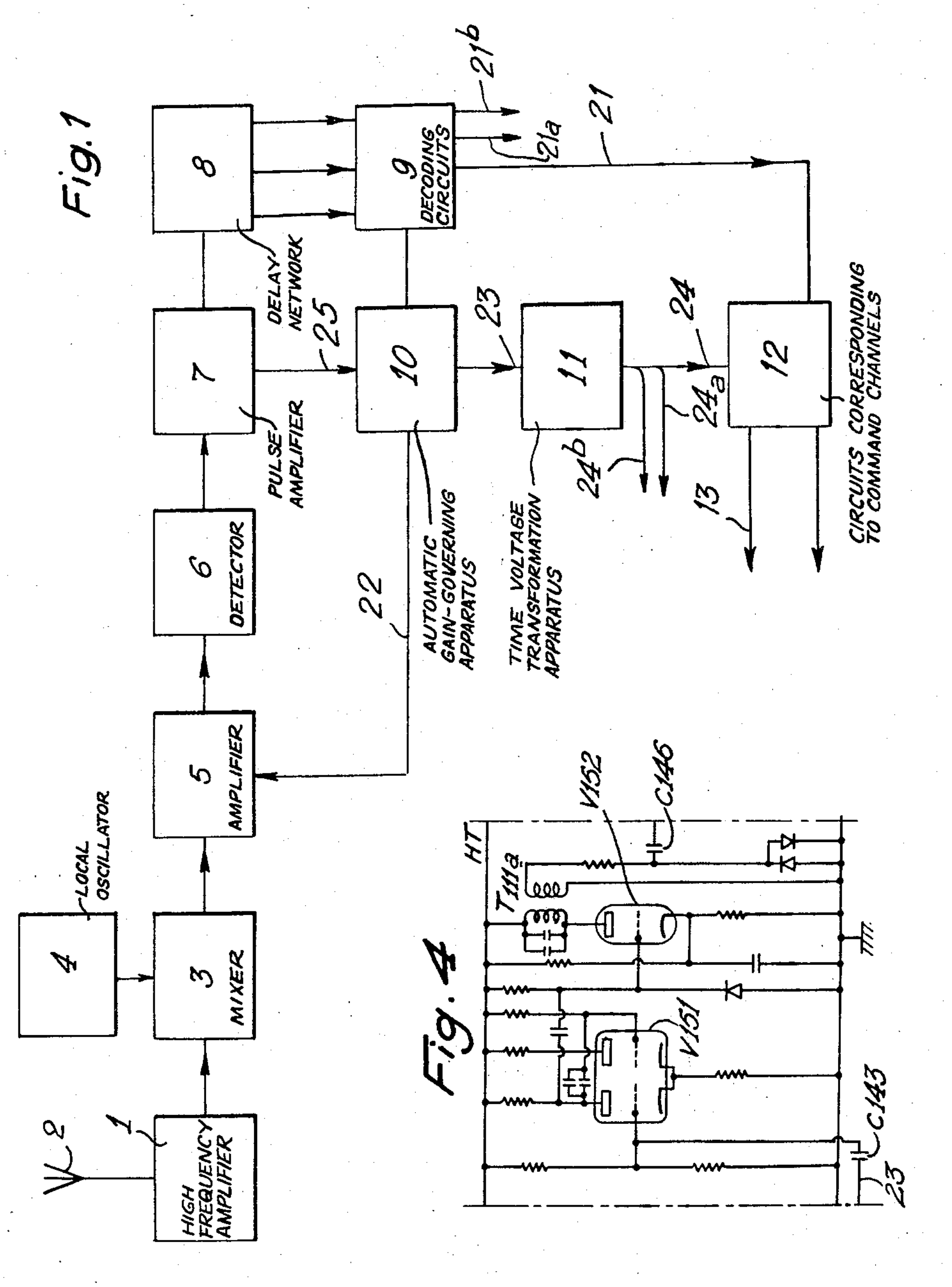
FIG. 1 is a diagrammatic illustration showing the way in which the various components in a coded-pulse receiver of the type well-known per se are connected together.
FIG. 4 is a partial view of a variant.

The receiver of known layout involved comprises a high-frequency amplifier 1 which receives electromagnetic energy from an antenna 2 and directs it towards a mixer 3 which receives the oscillations of a local oscillator 4 in order to provoke in said mixer a beat which is between the frequency of the carrier wave received by antenna 2 and the local frequency of the oscillator 4 and a non-linear amplification for the purpose of furnishing, to an amplifier 5, a medium frequency. This assembly constitutes the high frequency circuits of the receiver.

The medium frequency amplifier 5 amplifies the signal emerging from the mixer circuit and is followed by a detector 6 which causes the modulation pulses of the carrier wave to be discriminated from the rest. This detector is followed by a pulse amplifier 7 which enables the signals to be brought to a level adequate for the following transformations to be applied to them:

(*a*) The signals are directed towards a delay network 8 which may be preadjusted and which supplies, via its stepped outputs, the decoding circuits 9 which allow only the signals corresponding to the chosen code to emerge;

(*b*) The gain of medium-frequency amplifier 5 is governed by a circuit which receives, on the one hand, the amplified pulses from amplifier 7 to permit modification, after detection, of the tube bias in said amplifier 5, while, on the other hand, the decoding circuits 9 are connected to an automatic gain-governing apparatus 10 for the purpose of actuating a final mixer tube which governs the supply to amplifier 5 only if the pulses received correspond to the chosen code.

In this way there is no danger of the gain being diminished by parasite signals, irrespective of their origin, the receiver thereby remaining in an optimum condition enabling it to receive the useful signals by means of this specific and instantaneous gain-monitoring system for which suitable remanence means are provided.

A time-voltage transformation apparatus 11 permits separation of the signals corresponding to the various channels, this apparatus being connected to the one designated above by reference numeral 10 and which acts as the automatic gain-monitoring device. This time-voltage transformation operates with a recurrence corresponding to the synchronization signals and counts the times starting from the last pulse of the signal. This apparatus is triggered by the signal received from the decoding apparatus 9 through the medium of the gain monitor 10, for reasons set out below.

The circuits corresponding to the command channels, designated by the reference numeral 12, all of which are in parallel but only one of which is shown, are each connected to their inputs through the medium of a selector controlled by the time voltage transformation system and are naturally connected directly to the decoding circuits 9, said selector letting through only the signal issuing from the decoder 9 and belonging to the chosen channel. This command channel apparatus leads out circuits 13 towards command execution elements on each of which is provided a loop constituted by demodulation circuits.

Figure 2:
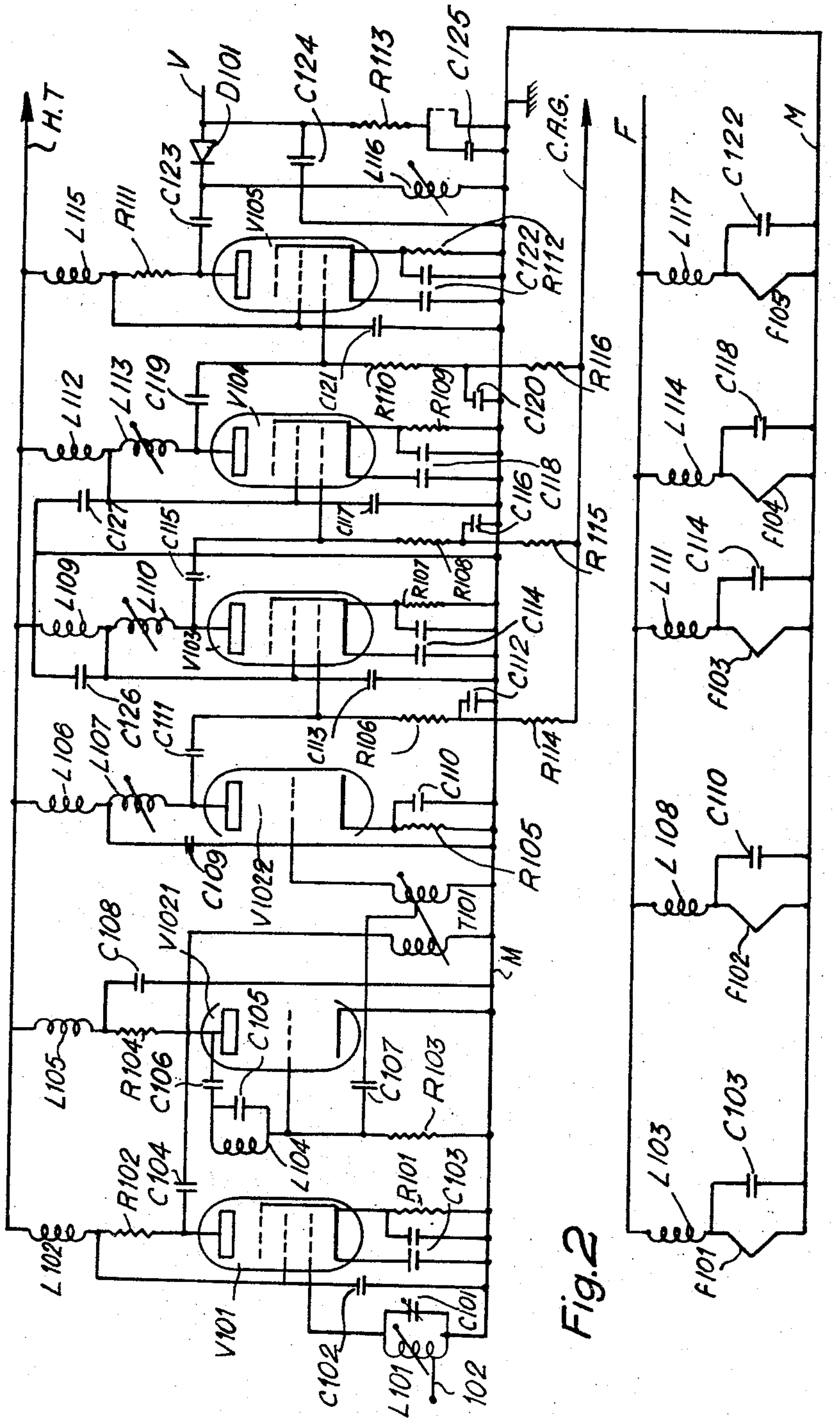
FIG. 2 is a wiring diagram of the receiver in the portion preceding the pulse amplifier, according to the invention.

As seen in FIG. 2, the high-frequency circuits are connected to an antenna 102 which is itself connected to a choke coil L101 connected in parallel to an adjustable capacitor C101, and this assembly is interposed between a master earth conductor M and the first grid of a tube V101. Adjustment of choke coil L101 and capacitor C101 permits correct adaptation of the antenna connection.

Tube V101 is connected to the master earth line, insofar as its cathode and its third grid are concerned, by two of the elements of a triple capacitor C103, the first element being directly connected to the earth wire, the second being connected to this earth wire with a resistor R101 connected in parallel, and the third element being connected to the earth wire in parallel on the heating filament *f*101 of said tube V101. The second grid of tube V101 is connected to the earth wire via a capacitor C102 and this second grid is directly connected across a resistor R102 and a choke coil L102 series-connected across the plate of tube V101 and the high-tension supply wire HT.

This plate is connected via a capacitor C104 to the primary of a transformer T101 connected to the earth wire M.

An intermediate tap on the secondary of this adjustable transformer T101 is connected via a capacitor C107 to the grid of a first element V1021 of a double triode V102 the cathode of which is directly connected to wire M. This grid is also connected to this wire M via a resistor R103; it is furthermore connected to the corresponding anode through the medium of a choke coil L104 connected in parallel on an adjustable capacitor C105, the complete assembly being series-connected to a capacitor C106. This anode is connected to the HT wire via a resistor R104 and a choke coil L105, the intermediate point between this resistor and this choke coil being connected to wire M via a capacitor C108.

One of the ends of the secondary T101 is connected to the wire M and the other to the grid of the triode V1022 which constitutes the second part of this triode. The corresponding cathode is connected to the earth wire via a capacitor C110 across which is parallel-connected a resistor R105. This capacitor is a double capacitor one element of which is used in this fashion and the other connected in parallel across the earth wire and the supply to the filament *f*102 of this double triode.

The corresponding anode of the second element of this double triode is connected to the HT line. The common point of the two choke coils L106 and L107 is connected to earth wire M via a capacitor C109. This anode is connected via a capacitor C111 to the first grid of a tube V103. This first grid is likewise connected, via a resistor R106 and a resistor R114, to the wire CAG from the automatic gain monitor. The common point of the two resistors R106 and R114 is connected to wire M via a capacitor C112.

Like the third grid, the cathode of tube V103 is earthed via two elements of a triple capacitor C114, one of these two elements being connected in parallel with a resistor R107 and the third element being connected in parallel across the filament *f*103 of the corresponding tube.

The second grid of tube V103 is earthed via a capacitor C113; it is furthermore connected to the common point of two choke coils L109 and L110 which are series-connected across the HT line and the anode of tube V103. The choke coil L110 is adjustable. This common point is connected to wire M via a capacitor C126.

The anode of tube V103 is connected, with an interposed capacitor C115, to the first grid of a tube V104. This first grid is itself connected to the wire CAG via the series-connected resistors R108 and R115, the common point of these two resistors being connected via a capacitor C116 to the wire M.

Like the third grid of tube V104, the latter's cathode is earthed through the medium of two of the elements of a capacitor C118 of which the second is connected in parallel across a resistor R109 and the third across the filament *f*104 of the tube.

The second grid of tube V104 is connected to wire M via a capacitor C117 and it is furthermore connected to the common point of two choke coils L112 and L113 which are series-connected across the HT line and the anode of tube V104. This common point is furthermore connected to wire M via a capacitor C127. The anode of tube V104 is connected via a capacitor C119 to the first grid of a tube V105. This first grid is connected to the wire CAG through the medium of two resistors R110 and R116 which are series-connected and whose common point is connected to the wire M via a capacitor C120.

The cathode of tube V105 is connected to the wire M via two of the elements of a triple capacitor C122, together with the third grid of that tube, a resistor R112 being connected across one of these two elements. The third element of capacitor C122 is connected across the filament *f*105 of this tube.

The second grid of tube V105 is connected via a capacitor C121 to wire M. This second grid is furthermore connected to the common point of a resistor R111 and a choke coil L115 which are series-connected across the anode of tube V105 and the HT supply line.

The anode of tube V105 is connected to a capacitor C123 and to a rectifier cell acting as a detector D101 which is ultimately connected to a wire V the purpose of which is to supply a video amplifier. An adjustable choke coil L116 is connected across the common point of capacitor C123 and diode D101 and the wire M. The wire V is earthed via a capacitor C124 across which are shunted, in series, a resistor R113 and a capacitor C125.

In addition, the filament supply wire F is connected to the filaments through the medium of choke coils L103, L108, L111, L114 and L117.

This being so, the signal from the antenna 102 excites the tuned circuit constituted by the choke coil L101, the input capacitor of tube V101 and the adjustable capacitor C101 the settings of which enable the antenna connection be correctly adapted.

The tube V101 operates as an automatic-bias, amplifying valve. This bias is provided by the cathode resistor R101 which is decoupled by the corresponding two elements of triple capacitor C103 the third element of which decouples the filament *f*101.

The change of frequency is effected through the medium of the double triode of which the first element V1021 is connected as an oscillator. The frequency of oscillation is determined by the choke coil L104, by the parasite capacitances of the tubes and the cables and by the adjustable capacitor C105. Bias of this frequency is provided by the leak resistor R103, the corresponding cathode being directly earthed.

The second element of this double triode V1022 serves for frequency changes, the connection to the high frequency amplifier being effected through the medium of the capacitor C104 and the wide-band, adjustable transformer T101.

The local oscillation is injected by the capacitor C107 which is coupled to the grid circuit of the tube element V1022. The latter operates as a non-linear amplifier causing the beat frequency to appear on its anode. The circuit of this anode is tuned to the desired medium frequency by the capacitor of tube element V1022. The bias is provided by the high-value resistor R105. Cathode decoupling is provided by the corresponding element of the multiple capacitor C110 another element of which ensures decoupling of the filament *f*102.

The two tubes V101 and V102 (double triode V1021 and V1022) are supplied with high-tension current via filter cells constituted by choke coils L102, L105 and L106 which are decoupled by the capacitors C102, C108 and C109. A similar filtration is provided by the choke coils L103 and L108 in the filament heating circuits.

In conjunction with their associated circuits, the three tubes V103, V104 and V105 form a medium-frequency amplifier leading up to the detection unit, these three tubes being frequency-shifted with respect to one another. The first two tubes V103 and V104 are connected in exactly the same way and the load impedances formed by a choke coil L110 and L113 are tuned with output capacitors by being series-connected across the anodes, the damping resistors R108 and R110 being placed in the grid circuits.

Conversely, the amplifier stage comprising the tube V105 is provided with a tuning circuit consisting of the choke coil L116 and the tube output capacitor; since this circuit is also part of the detection circuit, it is therefore tuned in parallel to its plate circuit provided with the resistor R111.

Inter-stage couplings are effected by means of the capacitors C111, C115, C119 and C123.

The screens of the three tubes are directly connected to the filtering cells constituted by the choke-coil/capacitor couples L109, C126, L112, C127 and L115, C121, interposed into the high-tension supplies to the anodes of the tubes.

For wiring reasons, the screens of tubes V103 and V104 are decoupled directly by capacitors C113 and C117.

These three tubes are biased automatically by the resistors R107, R109 and R112 inserted into their cathode circuits, these resistors being decoupled by capacitors C114, C118 and C122 respectively.

Low-impedance detection is provided by the diode D101 which is formed by a crystal and which is charged by impedance R113/C124.

In addition to the fixed cathode bias of the last three tubes referred to, a variable bias is also applied to them, in the manner well-known per se in receivers of the type described with reference to FIG. 1, to permit the gain to be governed. This bias is obtained in the following manner: the modulation, which is selectively amplified by a circuit to be described later, is detected by a threshold-type detector. Resistors R159 and R160, bridge-connected across earth and the HT supply line, form a threshold. The detection crystal and its leak resistor are connected so that they create a negative voltage when the magnitude of the pulses exceeds the threshold. If their magnitude is less than that value, then although a voltage is set up across the terminals of crystal D101, since the common point of resistors R114, R115 and R116 constituted by the wire CAG remains with a positive voltage, the tube bias set up by the cathode current remains virtually constant as does also the gain in each stage. In cases where the magnitude of the pulses oversteps the threshold, this same voltage is negative and rapidly increases the bias and the gain in each stage.

This amplifier and this detection system supply a decoding stage of the type well-known per se, described above with reference to FIG. 1.

Figure 3:
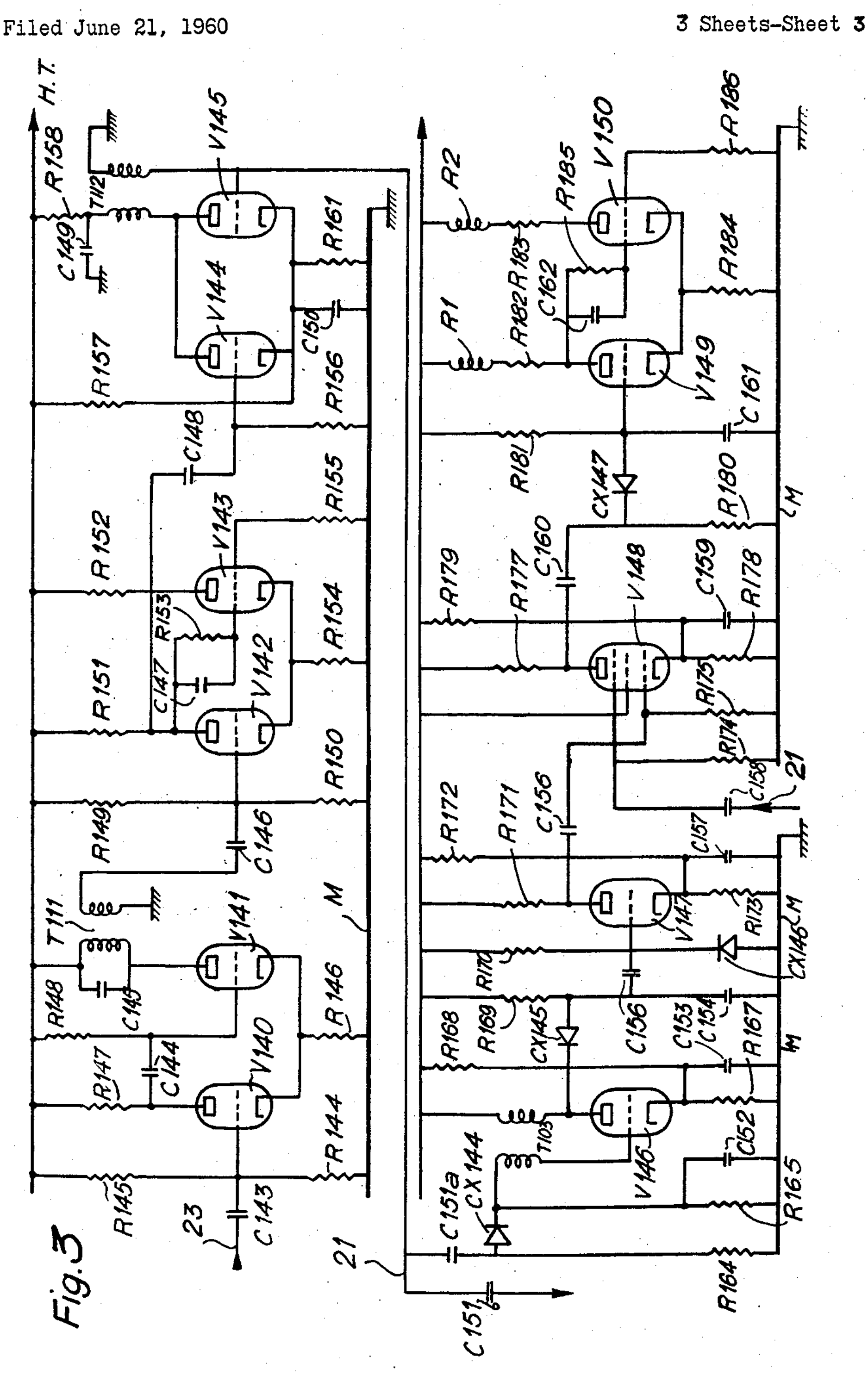
FIG. 3 illustrates diagrammatically the wiring used for channel separation and that used for one of the command channels according to the invention.

The separation of the command channels and these command channels themselves are shown diagrammatically in FIG. 3. These separation circuits comprise, on the conductor 23 emerging from the decoding unit described with reference to FIG. 1, a capacitor C143 to supply the grid of a tube V140, this grid being connected to an earth conductor M, via a resistor R144,, and to a high-tension supply line through the medium of a resistor R145. The cathode of this tube is directly connected to that of a neighbouring tube V141 and these two cathodes are connected in parallel to the wire M via a resistor R146. The anode of tube V140 is connected to the HT line via a resistor R147 and is furthermore connected to the grid of tube V141 via a capacitor C144. This grid is connected to the HT line via a resistor R148. The anode of tube V141 is connected to the HT line through the medium of the primary of a transformer T111 shunted by a capacitor C145.

The secondary of transformer T111 is connected to the grid of a tube V142 via a capacitor C146, this grid being connected to the wire M via a resistor R150 and to the HT line via a resistor R149. The cathode of tube V142 is connected in parallel with that of an adjacent tube V143 to a resistor R154 which provides coupling on to the wire M. The anode of tube V142 is connected to the HT line via a resistor R151; it is connected to the grid of tube V143 via the resistor R153 connected in parallel with a capacitor C147. The grid of tube V143 is furthermore connected to the wire M via a resistor R155. The anode of tube V143 is connected to the HT line via a resistor R152.

The anode of tube V142 is connected via a capacitor C148 to the grid of a tube V144. This grid is connected to the wire M via a resistor R156. The cathode of tube V144 is connected in parallel with the cathode of a tube V145 to a resistor R161 and a capacitor C150 which are themselves parallel-connected across the wire M and a resistor R157 linked to the HT line.

The anodes of tubes V144 and V145 are connected in parallel across the primary of a transformer T112 which is connected via a resistor R158 to the HT line and which is earthed via a capacitor C149.

The secondary of transformer T112 is earthed on the one hand and connected to the grid of tube V145 on the other.

This grid is connected via a wire 21 to a capacitor C151*a* which forms part of a set of command-channel input capacitors C151*a* and C151*b*, two of these being shown on the drawings together with a single command channel.

The capacitor C151*a* is connected to an earth wire M via a resistor R164; it is connected to the input of a crystal CX144 the output of which is earthed via a resistor R165 shunted across a capacitor C152. This crystal is connected via the primary of a transformer T103 to the grid of a tube V146. The cathode of this tube is connected to the wire M via a resistor R167 shunted across a capacitor C153 and is furthermore connected to a high-tension supply line HT via a resistor R168. The plate of tube V146 is connected to the secondary of transformer T103 which is coupled to the HT line and to a crystal CX145 which is itself connected via a resistor R169 to the HT line and via a capacitor C154 to the wire M; the secondary is furthermore connected via a capacitor C156 to the grid of a tube V147, this grid being itself connected to the HT line via a resistor R170 and to the wire M via a crystal CX146.

The cathode of tube V147 is connected to the wire M via a resistor R173 and via a capacitor C157; it is connected to the HT line via a resistor R172.

The anode of tube V147 is connected to the HT line via a resistor R171 and is connected to the first grid of a tube V148 through the medium of a capacitor C156.

The third grid of this tube V148 is connected to a conductor line from the decoder, designated by the reference numeral 21, with an interposed capacitor C158; it is additionally connected to the wire M via a resistor R174.

The cathode of tube V148 is connected to an earth wire M via a resistor R178 and a capacitor C159 connected in parallel; it is connected to the HT line via a resistor R179. The first grid of this tube is connected to the wire M via a resistor R175.

The anode is connected to the HT line via a resistor R177; it is connected to a capacitor C160 which is connected to a crystal CX147 and which is earthed via a resistor R180. This crystal is in turn connected to the HT line via a resistor R181 and to the wire M via a capacitor C161; it is furthermore connected to the first grid of a tube V149.

The cathode of this tube is shunted across that of a tube V150 and these two cathodes are connected to the wire M via a resistor R184.

The anode of tube V149 is connected to a resistor R182 which is itself joined to the HT line via a coil R1.

This anode is connected to the grid of tube V150 via a resistor R185 and a capacitor C162 connected in parallel.

The anode of this tube is connected via a resistor R183 to a relay coil R2 connected to the HT line.

Lastly, the grid of tube V150 is connected to the wire M via a resistor R186.

In order to restrict the danger of erroneous coincidences during decoding, the spaces between the pulses are preferably irregular, to make it possible for a train of several equidistant pulses to have three pulses in the same position, with respect to the time, as that of any one of the codes unless that train has a recurrence of the same order of magnitude as the length of the pulses; thus, for instance, if *a* be the minimum recurrence chosen, one is led to impose pulse intervals, relative to the original pulse, which are prime multiples of *a*, such as 3, 5, 8, 11, 14 and 17, so that only a pulse train of regular reference *a* is able to break through a code.

The circuit described above offers the advantage of remarkable gate position stability, allowing passage of various channels, with respect to the datum.

If the pulse trains constituted by the datum and the channels are equidistant from another with respect to the time or are at any rate separated by intervals which are simple multiples of a same basic interval, with such signals, it is possible for separating the channels, to utilize instead of a time-voltage transformation of conventional type, the above described dispositions which offers qualities of simplicity and stability as aforementioned.

The tubes V140 and V141 constitute a conventional flip-flop with the only exception that the plate charge of tube V141 is constituted by a transformer winding T111 which is tuned by the capacitor C145 so that it has an inherent period equal to the time interval separating the command channels. Since this circuit is intended to be controlled only by the reference pulses to the exclusion of the channel pulses, the signals led out from the decoding circuits along wire 23 are applied to the grid of tube V140 via capacitor C143. In the absence of any pulses, the tube V141 is maintained in a conducting state by its grid-leak resistor R148 returned to the high tension supply and by the resistor R146 which provides the cathode coupling for tubes V140 and V141, the tube V140 being kept blocked. Its grid is biased to a slightly positive voltage by the resistor bridge R144/R145 connected across earth and the high tension supply.

When a pulse reaches the grid of tube V140, the flip-flop operates and dwells in its new position for a time period which depends on the time constant constituted by resistor R148 and capacitor C144, R148 being the grid-leak of tube V141 and C144 the reaction capacitor of the flip-flop across the grid of tube V141 and the plate of tube V140.

This time constant can be accurately adjusted so that V141 remains blocked for a time which is slightly longer than the interval which separates the channel farthest from the reference signal from this latter signal itself. The primary of transformer T111 is in resonance during this time and gives a sinusoidal voltage variation with very slight damping, passing through a zero voltage in a given direction at an instant which corresponds to each channel pulse. When the flip-flop returns to its original position, the tube V141 begins to deliver, and the oscillating circuit constituted by the primary of transformer T111 is crossed by a constant current which saturates the winding and rapidly damps out the sinusoidal variation.

The secondary of this transformer T111 fulfils two functions: on the one hand, impedance adaptation to the next stage, and, on the other, reversal of the phase of the sinusoidal variation.

The frequency of this sinusoidal variation obtained in the primary of transformer T111 is independent of variations in the supply for, during the oscillation, no current flows through tube V141 so that the current flowing through this oscillating circuit has no D.C. component that can be linked to voltage variations in the supply current.

According to the variant shown in FIG. 4, instead of providing a flip-flop constituted by the tubes V140 and V141, which at the same time act as a sinusoidal signal generator in the transformer T111, it is possible to separate the flip-flop function from the sinusoidal signal generation function by means of a double triode V151 connected as a flip-flop and a triode V152 associated to a transformer T111*a*. The input is effected from the conductor 23 via capacitor C143 as in the case of FIG. 2, and the output is at the level of capacitor C146, in the same way.

Such a variant on the wiring layout operates in exactly the same way, but with a still higher degree of safety and with more advantageous manufacturing facilities and tolerances in spite of the need for an extra tube.

The two double stages which follow are exclusively intended to transform the sinusoid into square waves in order to cause a pulse to appear each time the waves pass through zero value, in the same direction as at the instant they begin to be formed.

The tubes V142 and V143 constitute a bi-stable multivibrator, according to the level of the grid of tube V142. This is a well-known type of circuit in which the plate charges are formed by resistors R151 and R152, with a common cathode charge formed by resistor R154 which provides the coupling between the two tubes in such a way that only one of the two is a conductor. The grid of tube V143 is biased by the bridge of resistors R155 and R153, connected across earth and the plate of tube V142. The capacitor C147 provides more rapid vibrating by transmitting, under low impedance, the variations in the anode state of tube V142 to the grid of tube V143. The R149/R150 resistor bridge supplies the bias to the grid of tube V142 so that in the absence of the aforementioned sinusoidal current the tube V142 should be conducting and the tube V143 blocked.

When a sinusoidal variation appears in the secondary of transformer T111, it is transmitted by capacitor C146 to the grid of tube V142 in order to begin lowering the voltage of that grid. Tube V142 then blocks rapidly and renders tube V143 conducting. Thus the anode of tube V142 dispatches a wave with a rising leading edge into the next circuit. When the sinusoid passes through zero again at the end of a half wave, the phenomenon is reversed and the anode of tube V142 dispatches a wave with a descending leading edge into the next circuit. In this way, the tube V142 forms square signals consisting of a succession of rising-wave leading edges obtained each time the sinusoid reaching the grid of that tube begins to be negative, and descending leading edges each time the sinusoid begins to be positive. Adjustment of the grid bias of tube V142 relative to its cathode bias enables these leading edges to be located very accurately relative to the zeroes of the sinusoid.

The plate of tube V142 is connected, via a differentiator circuit consisting of capacitor C148 and resistor R156, to the grid of tube V144, which thus receives a series of pulses which are equidistant and alternately positive and negative.

The tube V145 is connected up as a blocked oscillator and the tube V144 constitutes one of the elements of a coupling circuit. These two tubes together are maintained blocked by a cathode bias obtained by the bridge R157—R161 decoupled by capacitor R150. The grid of tube V144 is maintained at earth potential so long as there is no signal given by resistor R156, which at the same time is part of the differentiator circuit mentioned above. The two plates of tubes V144 and V145 are connected to one of the windings of transformer T112, the other end of which is led to the high tension supply via the filter constituted by resistor R158 and capacitor C149. The other winding is connected across the grid of this tube V145 and earth.

In this way, when a positive pulse reaches the grid of tube V144, a pulse of current passes into transformer T112 which releases the blocked oscillator, so that the latter is able to supply a pulse at low impedance. On the other hand, a negative pulse reaching the grid of tube V144 will not cause anything to happen.

The grid of tube V145 is connected via the wire 21 to capacitors C155*a*, C151*b*, etc. connected in parallel and serving as inputs for each of the command channels, these command channels being identical to one another except for the adjustment of their input circuits. The positive pulses pass through the capacitor C151*a* followed by a leak resistor R164 and then reach an accumulation-type counting system. The capacitor C152 constitutes a reservoir capacitance which is charged at each pulse with a certain quantity of electricity which is dependent upon the ratio between the capacitances of capacitors C151 and C152, this ratio being invariably chosen to be less than unity. This charge is effected via a detector crystal CX144 which conducts during the pulses and remains blocked the rest of the time. The resistor R165, whose value is high, is intended to slowly discharge the capacitor C152, but its value is such that this discharge should be very small during the time comprised between two pulses. The capacitor C152 is connected across earth and the primary of the transformer T103 the other end of which is connected to the grid of the tube V146. This tube is also connected up as a blocked oscillator, its cathode being maintained at a sufficient positive potential by the R167/R168 resistor bridge decoupled by the capacitor C153. The secondary of transformer T103 is connected across the plate of tube V146 and the high tension supply.

When the voltage developed across the terminals of capacitor C152 reaches a sufficient value after the successive charges tube V146 begins to conduct and the oscillator is released and supplies a pulse. The cathode bias of tube V146 is adjusted so that the tube V146 should begin to conduct after one charge, after two charges or after several charges, depending on the command channel. Thus tube V146 supplies a pulse which is in phase with the first, the second or the *n*th pulse furnished by tube V145, this pulse being itself in phase with the channel pulses of the first, second or *n*th channel.

The next channel, which consists of two detector crystals CX145 and CX146 and a tube V147 is intended to widen the pulses furnished by tube V146 into a coincidence gate and serves only when the pulses corresponding to the signals of each command channel do not form, with the reference pulse, a system of equidistant signals as indicated above, but instead are separated from the reference pulse by a slightly larger interval while nevertheless remaining equidistant from one another. In that case, each channel signal comes into effect for a short instant after the corresponding pulse furnished by tube V145, and it is necessary to form a signal of longer duration in order to actuate any electronic selector which may still be open when the actual channel signal arrives.

The negative pulses delivered by the anode of tube V146 are transmitted by crystal CX145 to an integrating cell formed by the capacitor C154 connected to earth on the one hand and to the high-tension supply on the other, through the medium of a resistor R169.

The descending leading edge of the pulse thus charges capacitor C154 via the direct resistance of crystal CX145. The rising trailing edge of the pulse blocks this crystal and the capacitor C154 discharges exponentially via resistor R169. This signal, whose leading edge is a steep and descending front corresponding to the leading edge of the pulse of oscillator V146 and whose trailing edge is an exponential, is launched by the liaison capacitor C155 onto the grid of tube V147. This grid tends to be returned to high tension by the leak resistor R170, but the positive voltage to which it can rise is limited to the voltage of the corresponding cathode, which is in turn fixed by the R172/R173 resistor bridge decoupled by capacitor C157.

In the absence of a signal, the tube V147 is conducting, since its grid is at the same voltage as its cathode. When the descending front of the signal reaches the grid, the latters voltage drops to that of earth; this voltage cannot become negative relative to earth since it is connected thereto by crystal CX146 which, in this direction, offers only low direct impedance. Thus capacitor C155 charges without the grid voltage varying and the tube V147 is then blocked. The anode of this tube, charged by the resistor R171, which was at a fairly low voltage, rises to high tension. When capacitor C154 begins to discharge, the grid voltage of tube V147 rises again according to the same law and, when it reaches the required value, tube V147 becomes conducting again and the plate voltage returns to its original value. The time for which the tube V147 stays conducting is therefore regulated by the rate of discharge of capacitor C154 via resistor R169.

To summarize, the plate of tube V147 furnishes a positive square signal whose leading edge corresponds to one of the zeroes of the sinusoid formed in the input oscillating circuit (transformer T111 and capacitor C145), this zero being chosen according to the channel it is desired to select. The trailing edge of this signal is separated from the latter leading edge by a time interval which is adjusted by the time constant constituted by resistor R169 and capacitor C154.

The channel signals from the decoder are applied to the third grid of tube V148 via input capacitor C158, while the signal of tube V147 is launched by capacitor C156 on to the first grid of that same tube which thus functions as a coincidence tube. This tube V148 is normally blocked by a cathode bias resulting from the R178/R179 resistor bridge decoupled by capacitor C159. Tube V148 can be conducting only when a signal is launched simultaneously into its first and third grids; its second grid is directly connected to the high tension supply and its anode through the medium of resistor R177. Thus this anode is able to supply a negative pulse uniquely for the selected channel, each time a pulse appears on that channel.

These pulses are transmitted via the coupling constituted by capacitor C160 and resistor R180 to the cathode of diode CX147 the anode of which is connected to the grid of tube V149. This grid is furthermore connected to the high tension supply via a resistor R181. Together with the tube V150, the tube V149 forms a flip-flop which, in the absence of any signal, occupies a position in which V149 is conducting while V150 is blocked. This flip-flop, which is connected in very similar fashion to the one formed by tubes V142 and V143, operates when a negative pulse reaches the cathode of crystal CX147. This pulse instantly charges, via that crystal, the capacitor C161. The flip-flop changes its position of equilibrium, the tube V149 being blocked while the tube V150 now becomes conducting. When the pulse is terminated, the crystal CX147 returns to the blocked condition and capacitor C161 discharges into resistor R181. The grid of tube V149 rises again towards high-tension according to an exponential law and, when the voltage becomes adequate, the flip-flop resumes its steady state in which the tube V149 is conducting. The law governing discharge of capacitor C161 is regulated by the time constant constituted by the capacitor C161 and the resistor R181 so that the flip-flop is not able to return to its steady state between two successive pulses appearing on the same channel.

Coupling between the tubes V149 and V150 is obtained both by the cathode resistor R184 which is common to both tubes and by the bias bridge, formed by resistors R185 and R186 of the grid of tube V150, this bridge being connected across earth and the plate of tube C149. The steep fronts are furthermore transmitted from the plate of tube V149 to the grid of tube V150 by the capacitor C162. Lastly, the plates are connected, with the corresponding resistors R182 and R183 in series, to the utilization circuits which may be constituted by the relay coils R1 and R2.

Thus, if the command channels were to feature an on-off type of modulation, the tube V149 would be continuously conducting if pulses were present. The absence of a single pulse would suffice to make the tube V150 conducting instead, the flip-flop remaining in this new position until a fresh pulse arrives.

Thus a reliable system is made available, operation of which is easily adjustable.

Clearly, many modifications to the specific embodiments described can be made without departing from the scope of my invention.

What I claim is:

1. In a receiver for radio-electric coded pulses: an antenna, a high-frequency amplifier coupled to the antenna and comprising at least one self biasing tube including an anode, cathode and grid, a wide-band transformer including a primary winding, said primary winding being electrically connected to the anode of said tube, said transformer further including a secondary winding in turn including an intermediate tap, a local oscillator electrically connected to said intermediate tap, a double tube including a first part constituting said local oscillator and a second part which constitutes a frequency mixer and is electrically connected to said secondary winding, a medium frequency amplifier electrically connected to said mixer, a detector electrically connected to said medium frequency amplifier, a pulse amplifier electrically connected to said detector, a delay network electrically connected to said pulse amplifier and including a plurality of outlets, a decoding assembly with inlets respectively electrically connected to said outlets, said decoding assembly including a plurality of outlets, an automatic gain governor including an outlet line electrically connected to said medium frequency amplifier and two inlet lines one of which is electrically connected to said pulse amplifier and the other to said decoding assembly, a time-voltage transformation apparatus including an inlet line connected to said gain governor and parallel outlet lines, and at least one command-channel assembly including an inlet line connected to one of said parallel outlet lines and another inlet line connected to one of the outlets of said delay network.

2. In a receiver for radio-electric coded pulses: an antenna, a high-frequency amplifier coupled to the antenna and comprising at least one self biasing tube including an anode, cathode and grid, a wide-band transformer including a primary winding electrically connected to the anode of said tube, said transformer further including a secondary winding in turn including an intermediate tap, a local oscillator electrically connected to said intermediate tap, a double tube including a first part which constitutes said local oscillator and a second part which constitutes a frequency mixer and is electrically connected to said secondary winding, said second part of said double tube being a non-linear amplifier, a medium frequency amplifier electrically connected to said mixer, a detector electrically connected to said medium frequency amplifier, a pulse amplifier electrically connected to said detector, a delay network electrically connected to said pulse amplifier and including a plurality of outlets, a decoding assembly including inlets respectively electrically connected to the outlets of said delay network and further including a plurality of outlets, an automatic gain governor including an outlet line electrically connected to said medium frequency amplifier and two inlet lines one of which is electrically connected to said pulse amplifier and the other to said decoding assembly, a time-voltage transformation apparatus including an inlet line connected to said gain-governor and parallel outlet lines, and at least one command-channel assembly including an inlet line connected to one of said parallel outlet lines and another inlet line connected to one of the outlets of said delay network.

3. In a receiver for radio-electric coded pulses: an antenna, a high-frequency amplifier coupled to the antenna and comprising at least one self biasing tube including an anode, cathode and grid, a wide-band transformer including a primary winding electrically connected to the anode of said tube and further including a secondary winding in turn including an intermediate tap, a local oscillator electrically connected to said intermediate tap, a double tube including a first part which constitutes said local oscillator and a second part which constitutes a frequency mixer electrically connected to said secondary winding, a medium frequency amplifier comprising three frequency-shifted tubes, each of the latter said tubes including an anode, grid and cathode, resistors and capacitors connecting the cathodes of the latter said tubes with ground to provide self biasing, the grid of one of the latter said tubes being electrically connected to said mixer, a detector electrically connected to said medium-frequency amplifier, a pulse amplifier electrically connected to said detector, a delay network electrically connected to said pulse amplifier and including a plurality of outputs, a decoding device including a plurality of inputs respectively electrically connected to the outputs of said network and further including a plurality of outputs, an automatic gain control device including an output line, resistors connecting the latter said lines to grids of said three tubes, a pair of input lines in said automatic gain control device, one of which is electrically connected to said pulse amplifier and the second of which is connected to said decoding device, a time-voltage transformation apparatus including an inlet line connected to said gain governor and parallel outlet lines, and at least one command-channel assembly including an inlet line connected to one of said parallel outlet lines and one other inlet line connected to one of the outlets of said delay network.

4. A receiver for radio-electric coded pulses according to claim 3, wherein said detector is a crystal detector, comprising a threshold device coupled to and controlling said detectors.

5. A receiver for radio-electric coded pulses according to claim 1, wherein said high frequency amplifier, said local oscillator, said mixer, and said medium frequency amplifier comprise tubes including filaments, said receiver further comprising a feeding circuit and individual filters connecting said feeding circuit to said filaments.

6. A receiver for radio-electric coded pulses according to claim 1, wherein said high frequency amplifier, said local oscillator, and said mixer comprise tubes including anode circuits, said receiver further comprising a high voltage supply circuit and individual filters connecting said supply circuit to said anode circuits.

7. In a receiver for radio-electric coded pulses: an antenna, a high-frequency amplifier coupled to the antenna and comprising at least one self biasing tube including an anode, cathode and grid, a wide-band transformer including a primary winding, said primary winding being electrically connected to the anode of said tube, said transformer further including a secondary winding in turn including an intermediate tap, a local oscillator electrically connected to said intermediate tap, a double tube including a first part constituting said local oscillator and a second part which constitutes a frequency mixer and is electrically connected to said secondary winding, a medium frequency amplifier electrically connected to said mixer, a detector electrically connected to said medium frequency amplifier, a pulse amplifier electrically connected to said detector, a delay network electrically connected to said pulse amplifier and including a plurality of outlets, a decoding assembly with inlets respectively electrically connected to said outlets, said decoding assembly including a plurality of outlets, an automatic gain governor including an outlet line electrically connected to said medium frequency amplifier and two inlet lines one of which is electrically connected to said pulse amplifier and the other to said decoding assembly, a mono-stable flip-flop including two tubes, a time constant device electrically connected to said flip-flop, said time constant device having a time lag greater than the time which separates a reference signal and a channel signal which is the most delayed with respect to said reference signal, a transformer including a primary winding electrically connected to one tube of said flip-flop, said primary winding being saturated during unblocking of said flip-flop and generating a sinusoidal oscillation during blocking of the other tube of said flip-flop, said one tube of said flip-flop including a grid electrically connected to said automatic gain governor, means for shaping square signals electrically connected to said flip-flop, a low impedance transforming apparatus for said square signals and including a plurality of outputs in parallel, and at least one command channel electrically connected to one of the latter said outputs and to one of the outputs of said decoding circuit.

8. In a receiver for radio-electric coded pulses: an antenna, a high-frequency amplifier coupled to the antenna and comprising at least one self biasing tube including an anode, cathode and grid, a wide-band transformer including a primary winding electrically connected to the anode of said tube, said transformer further including a secondary winding in turn including an intermediate tap, a local oscillator electrically connected to said intermediate tap, a double tube including a first part which constitutes said local oscillator and a second part which constitutes a frequency mixer and is electrically connected to said secondary winding, said second part of said double tube being a non-linear amplifier, a medium frequency amplifier electrically connected to said mixer, a detector electrically connected to said medium frequency amplifier, a pulse amplifier electrically connected to said detector, a delay network electrically connected to said pulse, amplifier and including a plurality of outlets, a decoding assembly including inlets respectively electrically connected to the outlets of said delay network and further including a plurality of outlets, an automatic gain governor including an outlet line electrically connected to said medium frequency amplifier and two inlet lines one of which is electrically connected to said pulse amplifier and the other to said decoding assembly, a mono-stable flip-flop including two tubes, a time-constant device electrically connected to said flip-flop, said time-constant device having a time lag greater than the time which separates a reference signal and a channel signal the most delayed with respect to said reference signal, a triodetube electrically connected to said flip-flop, a transformer including a primary winding connected to said triodetube whereby with said flip-flop blocked, said transformer generates a sinusoidal oscillation, and whereby said primary winding is saturated with said flip-flop unblocked, said flip-flop being electrically connected to said automatic gain governor, means for shaping square signals electrically connected to said flip-flop, low impedance transforming apparatus for shaping said square signals as pulses and including outputs in parallel, and at least one command channel electrically connected to one of the latter said outputs, said command channel being electrically connected to one of the outputs of said decoding circuit.

9. In a receiver for radio-electric coded pulses: an antenna, a high-frequency amplifier coupled to the antenna and comprising at least one self biasing tube including an anode, cathode and grid, a wide-band transformer including a primary winding electrically connected to the anode of said tube, said transformer further including a secondary winding in turn including an intermediate tap, a local oscillator electrically connected to said intermediate tap, a double tube including a first part which constitutes said local oscillator and a second part which constitutes a frequency mixer and is electrically connected to said secondary winding, said second part of said double tube being a non-linear amplifier, a medium frequency amplifier electrically connected to said mixer, a detector electrically connected to said medium frequency amplifier, a pulse amplifier electrically connected to said detector, a delay network electrically connected to said pulse amplifier and including a plurality of outlets a decoding assembly including inlets respectively electrically connected to the outlets of said delay network and further including a plurality of outlets, an automatic gain governor including an outlet line electrically connected to said medium frequency amplifier and two inlet lines one of which is electrically connected to said pulse amplifier and the other to said decoding assembly, a mono-stable flip-flop including two tubes, a time constant device electrically connected to said flip-flop and having a time lag greater than the time which separates a reference signal and a channel signal which is the most delayed with respect to said reference signal, a transformer including a primary winding electrically connected to one tube of said flip-flop, said primary winding being saturated during unblocking of said flip-flop and generating sinusoidal oscillations during blocking of said flip-flop, said transformer including a secondary winding constituting an impedance adapter and a phase inverter, a double transformer stage for connecting said sinusoidal oscillations into corresponding square signals, said transforming stage being electrically connected to the secondary winding of the latter said transformer, a transforming device for converting said square signals into corresponding pulses and including a plurality of outputs in parallel, and at least a command channel electrically connected to one of the latter said outputs and to one of said outputs of said decoding device.

10. A receiver for radio-electric coded pulses, according to claim 9, wherein said double transforming stage comprises a bi-stable flip-flop, a differentiating circuit electrically connected to said bi-stable flip-flop, a second stage with two tubes one of which is a coupling tube for said differentiating circuit and the second of which is a blocked oscillator.

11. In a receiver for radio-electric coded pulses: an antenna, a high-frequency amplifier coupled to the antenna and comprising at least one self biasing tube including an anode, cathode and grid, a wide-band transformer including a primary winding, said primary winding being electrically connected to the anode of said tube, said transformer further including a secondary winding in turn including an intermediate tap, a local oscillator electrically connected to said intermediate tap, a double tube including a first part constituting said local oscillator and a second part which constitutes a frequency mixer and is electrically connected to said secondary winding, a medium frequency amplifier electrically connected to said mixer, a detector electrically connected to said medium frequency amplifier, a pulse amplifier electrically connected to said detector, a delay network electrically connected to said pulse amplifier and including a plurality of outlets, a decoding assembly with inlets respectively electrically connected to said outlets, said decoding assembly including a plurality of outlets, an automatic gain governor including an outlet line electrically connected to said medium frequency amplifier and two inlet lines one of which is electrically connected to said pulse amplifier and the other to said decoding assembly, a time-voltage transformation apparatus including an inlet line connected to said gain governor and parallel outlet lines, and at least one command-channel assembly including an inlet line connected to one of said parallel outlet lines, a computing capacitor, an input capacitor electrically connected to said computing capacitor forming a reservoir, a diode coupled to said computing capacitor and a resistor electrically connected to said computing capacitor whereby the latter is slowly discharged, an output line for said command channel and an input line electrically connected between said command channel and said decoding device.

References Cited in the file of this patent

UNITED STATES PATENTS

| | | |
|---|---|---|
| 2,512,614 | Earp | June 27, 1950 |
| 2,517,618 | Young | Aug. 8, 1950 |
| 2,726,386 | Camp | Dec. 6, 1955 |